United States Patent
Pontes Bittencourt

(10) Patent No.: US 10,525,449 B2
(45) Date of Patent: Jan. 7, 2020

(54) PROCESS FOR PREPARING A NICKEL-BASED CATALYST, THE NICKEL-BASED CATALYST, AND USE THEREOF IN A STEAM REFORMING PROCESS

(71) Applicant: PETROLEO BRASILEIRO S.A.-PETROBRAS, Rio de Janeiro, RJ (BR)

(72) Inventor: Roberto Carlos Pontes Bittencourt, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 44 days.

(21) Appl. No.: 15/718,833

(22) Filed: Sep. 28, 2017

(65) Prior Publication Data
US 2018/0085740 A1 Mar. 29, 2018

(30) Foreign Application Priority Data
Sep. 28, 2016 (BR) .......................... 10 2016 022467

(51) Int. Cl.
*B01J 23/755* (2006.01)
*B01J 35/10* (2006.01)
*B01J 37/02* (2006.01)
*B01J 37/08* (2006.01)
*C01B 3/40* (2006.01)

(52) U.S. Cl.
CPC ......... *B01J 23/755* (2013.01); *B01J 35/1009* (2013.01); *B01J 35/1014* (2013.01); *B01J 35/1019* (2013.01); *B01J 35/1023* (2013.01); *B01J 35/1028* (2013.01); *B01J 37/024* (2013.01); *B01J 37/0236* (2013.01); *B01J 37/0242* (2013.01); *B01J 37/0244* (2013.01); *B01J 37/08* (2013.01); *C01B 3/40* (2013.01); *C01B 2203/0233* (2013.01); *C01B 2203/1058* (2013.01); *C01B 2203/1205* (2013.01); *C01B 2203/1223* (2013.01); *C01B 2203/1241* (2013.01); *C01B 2203/1247* (2013.01)

(58) Field of Classification Search
CPC .. B01J 23/755; B01J 35/1009; B01J 35/1014; B01J 35/1019; B01J 35/1023; B01J 35/1028; B01J 37/0236; B01J 37/024; B01J 37/0242; B01J 37/0244; B01J 37/08
See application file for complete search history.

(56) References Cited

U.S. PATENT DOCUMENTS

| | | | | |
|---|---|---|---|---|
| 2,581,228 | A | * 1/1952 | Bailey | B01J 23/74 502/259 |
| 3,351,567 | A | * 11/1967 | Moehl | B01J 21/12 423/653 |
| 3,759,678 | A | 9/1973 | Du Pont | |
| 4,065,484 | A | * 12/1977 | Dobashi | B01J 23/755 502/335 |

(Continued)

*Primary Examiner* — Cam N. Nguyen
(74) *Attorney, Agent, or Firm* — Sughrue Mion, PLLC

(57) ABSTRACT

The present invention relates to a process for preparing a nickel-based catalyst promoted with aluminium compounds with increased resistance to thermal deactivation and to the nickel-based catalyst thus obtained. In addition, the present invention relates to the use of said catalyst in a steam reforming process starting from hydrocarbons for producing hydrogen or synthesis gas.

11 Claims, 1 Drawing Sheet

(56) References Cited

U.S. PATENT DOCUMENTS

| | | | | |
|---|---|---|---|---|
| 4,100,109 A * | 7/1978 | Muller | ................... | B01J 23/24 502/314 |
| 4,273,680 A * | 6/1981 | Halluin | ................... | B01J 23/75 502/259 |
| 4,298,766 A * | 11/1981 | Broecker | ............... | B01J 23/755 502/335 |
| 4,307,248 A * | 12/1981 | Barnett | ................... | B01J 23/75 502/235 |
| 4,318,829 A * | 3/1982 | Halluin | ................... | B01J 23/75 502/252 |
| 4,717,707 A * | 1/1988 | Kemp | ................... | B01J 27/188 208/216 R |
| 4,738,945 A * | 4/1988 | Kemp | ................... | B01J 27/188 502/210 |
| 4,786,404 A * | 11/1988 | Kemp | ................... | B01J 27/188 208/213 |
| 4,810,686 A * | 3/1989 | Kemp | ................... | B01J 27/188 208/216 R |
| 4,810,687 A * | 3/1989 | Kemp | ................... | B01J 23/85 208/216 R |
| 4,853,108 A * | 8/1989 | Kemp | ................... | B01J 27/188 208/216 R |
| 5,169,824 A * | 12/1992 | Saleh | ................... | B01J 23/755 502/259 |
| 5,399,537 A * | 3/1995 | Bhattacharyya | ....... | B01J 23/005 423/592.1 |
| 5,939,353 A * | 8/1999 | Bhattacharyya | ....... | B01J 23/005 423/600 |
| 6,203,695 B1 * | 3/2001 | Harle | ...................... | B01J 21/04 208/111.3 |
| 7,196,036 B2 * | 3/2007 | Kobayashi | ............... | B01J 23/78 502/327 |
| 7,528,092 B2 * | 5/2009 | Berben | ................... | B01J 23/78 502/251 |
| 7,737,075 B2 * | 6/2010 | Ryu | ...................... | B01J 23/755 502/259 |
| 7,737,079 B2 * | 6/2010 | Ryu | ...................... | B01J 23/755 502/315 |
| 8,575,063 B2 * | 11/2013 | Xu | ........................ | B01J 23/755 502/335 |
| 8,877,671 B2 * | 11/2014 | Radlowski | ............. | B01J 23/882 502/167 |
| 8,883,118 B2 * | 11/2014 | Takahashi | ............. | B01J 21/005 423/648.1 |
| 8,916,492 B2 | 12/2014 | Skjoth-Rasmussen et al. | | |
| 9,566,572 B2 * | 2/2017 | Radlowski | ............. | B01J 23/882 |
| 9,644,044 B2 * | 5/2017 | Sandee | ................... | C08F 8/04 |
| 9,789,470 B2 * | 10/2017 | Jacobsen | ............... | B01J 37/088 |
| 2012/0329645 A1 | 12/2012 | Skjoth-Rasmussen et al. | | |

* cited by examiner

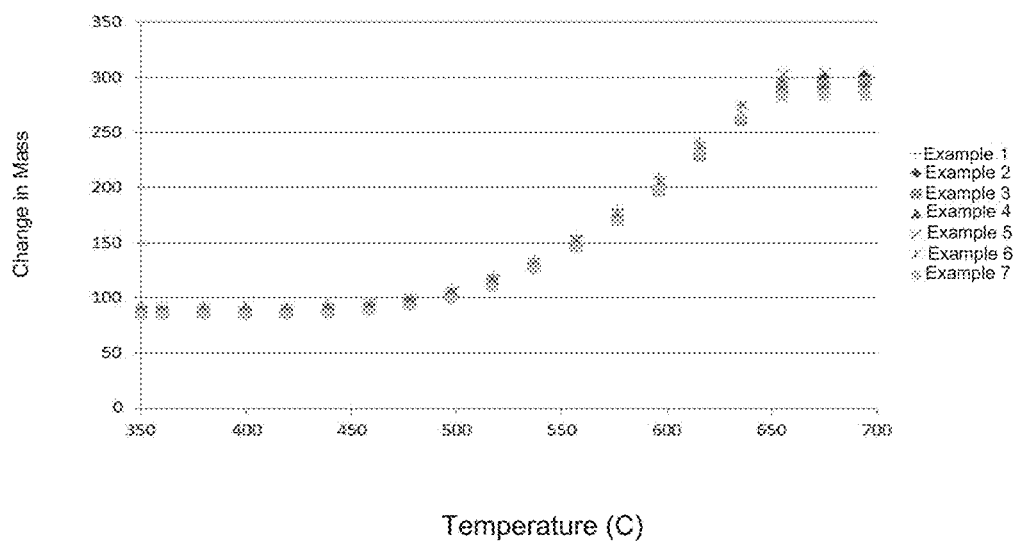

PROCESS FOR PREPARING A NICKEL-BASED CATALYST, THE NICKEL-BASED CATALYST, AND USE THEREOF IN A STEAM REFORMING PROCESS

FIELD OF THE INVENTION

The present invention relates to a process for preparing a nickel-based catalyst, to the nickel-based catalyst thus obtained, to the use thereof in a steam reforming process and to a steam reforming process.

BACKGROUND OF THE INVENTION

Hydrogen is a promising energy source due to the high calorific value supplied, besides being a product causing barely any pollution of the environment.

Hydrogen or hydrogen-rich gases, called synthesis gases, are produced on a large scale for use in the refining industry in processes for hydrofining of streams derived from petroleum, such as gasoline or diesel, ensuring that their quality meets the current standards of environmental legislation. Hydrogen also finds extensive application in the petrochemical industry for production of synthetic fuels (GTL), methanol, ammonia, urea and other widely used products.

There are various industrial processes for converting natural gas and other hydrocarbons to synthesis gas, but steam reforming is the main process for producing hydrogen on an industrial scale. The main reactions that occur in the steam reforming process are presented below:

$C_nH_m + nH_2O \rightleftharpoons nCO + (n+½m_n)H_2$ (endothermic reaction)  Reaction 1

$CH_4 + H_2O \rightleftharpoons CO + 3H_2$ (endothermic, 206.4 kJ/mol)  Reaction 2

$CO + H_2O \rightleftharpoons CO_2 + H_2$ (exothermic, -41.2 kJ/mol)  Reaction 3

The steam reforming process is usually carried out by introducing the hydrocarbon feed, selected from natural gas, refinery gas, liquefied petroleum gas, propane, butane or naphtha, purified beforehand by removing sulphur compounds, chlorides, heavy metals and/or olefins, and steam in excess relative to stoichiometry (reactions 1, 2 and 3) in a variable number of reactors consisting of metal tubes with typical dimensions of outside diameter from 7 to 15 cm and height between 6 10 to 13 m containing catalysts. These tubes are located inside a furnace, which supplies the heat required for the reactions. The assembly consisting of reactors and heating furnace is called a primary reformer.

However, the main problem in the generation of hydrogen or synthesis gas relates to the catalyst employed. Among other requirements, the catalyst must be efficient, must possess reasonable stability over a long period of time, and must be resistant to carbon deposits and to temperature.

Therefore the appropriate choice of catalyst has direct consequences for the costs of the process for producing hydrogen or synthesis gas. Accordingly, the use of more efficient catalytic systems and/or optimization of their performance in traditional processes are beginning to be of fundamental importance.

The catalysts used industrially in the steam reforming process typically consist of species of nickel oxide deposited on a refractory support. The supports used commercially are alpha-alumina and refractory cements of the calcium aluminate and/or magnesium aluminate type, or a mixture thereof. As examples from the literature, we may cite documents US 2002/0329645 and U.S. Pat. No. 3,759,678, which teach that nickel-based steam reforming catalysts are often prepared with the metallic nickel phase supported on alumina. When used as a support, alumina, especially the crystalline form called alpha-alumina, is used for providing a large surface area where the higher-cost active phase based on nickel oxides is dispersed, which will then be converted to metallic nickel prior to industrial use.

However, the prior art teaches that it is desirable for the alumina to be as inert as possible when used as a support, since the migration of aluminium species present in the support during the steps of catalyst preparation cause a major difficulty in reduction of the nickel oxide species present in the support (Lundegaard, L. F. L. et al., *Catalysis Today*, 2015).

Furthermore, the steam reforming process employs a typical inlet temperature of the mixture of hydrocarbons and steam in the reactors of the primary reformer from 400 to 550° C., and an outlet temperature from 750 to 950° C., at typical pressures from 10 to 40 kgf/cm². These harsh conditions lead to the use of expensive nickel alloys for making the tubes, which accounts for a large fraction of the fixed costs of the process. The tubes are designed to operate for 100 000 hours in the design conditions of temperature and pressure. However, the useful life of the tubes is greatly reduced if the tube wall temperature exceeds the design value (*Catalytic Steam Reforming*, J. R. Rostrup-Nielsen; Springer-Verlag, 1984). Besides reducing the useful life of the tubes, a high tube wall temperature may cause a reduction in the capacity of the unit and/or stoppage thereof for replacing the catalyst, with the aim of minimizing the risks of tube breakage in operation (*AlChe Safety* 2004, *Common problems on primary reformers*).

Therefore, despite being widely used in industry, nickel-based catalysts for producing hydrogen or synthesis gas undergo deactivation by various mechanisms, including coke formation, poisoning due to the presence of sulphur compounds and chloride in the feed, and thermal deactivation, also called sintering of the active phase, which arises from the natural tendency of metals to agglomerate when exposed to high temperatures. This reduces the efficiency of the catalysts, leading to an increase in the costs of production of hydrogen or synthesis gas or, in more severe cases of deactivation, compromising the process or even leading to faults in the metallurgy of the tubes (reactors), with significant costs resulting from stopping the unit and with risks from the standpoint of safety of the equipment and of personnel.

Thus, it is highly desirable for steam reforming catalysts to be developed with high activity and possessing properties that allow this activity to be maintained for long periods, typically more than 3 years, preferably 5 years, which are typical times for scheduled stops for maintenance of oil refinery units. A technical solution taught in the literature for reducing deactivation of the catalyst by the process designated as sintering (*Applied Catalysis A: General* 498 (2015) 117-125), which occurs through agglomeration of the active phase or of the support when exposed to high temperatures, relates to the use of noble metals as promoters, selected from Ir, Rh and Ru to form a metal alloy with nickel. This technical solution is also adopted for processes of partial oxidation combined with steam reforming, as taught in patents U.S. Pat. No. 8,916,492 B2 and US 2012/0329645 A1.

Following this same line, in "*Improving the sintering resistance of Ni/Al₂O₃ steam reforming catalysts by promotion with noble metals*", 18*th Brazilian Congress on Cataly-*

*sis*", Fernando Morales Cano et al. teach the use of Rh, Ir and Ru as a promoter of a steam reforming catalyst of the Ni/α-alumina type for mitigating the sintering of the Ni active phase, the effect observed having been explained by the formation of metal alloys.

Document US 2002/0329645 A1 already teaches that the method of forming metal alloys between Ni and noble metals to reduce sintering is also applicable to the production of hydrogen in processes for steam reforming of hydrocarbons in the presence of oxygen, just like the partial oxidation process or the autothermal reforming process.

However, the use of noble metals in catalysts causes high costs, reducing their use in processes for large-scale production of hydrogen, such as those with an output above 10 000 $Nm^3$/day. This solution is thus of reduced industrial applicability owing to the limited availability of the promoters based on noble metals and the high cost of the resultant final product.

Thus, it is noted that there is still a need to provide a process for preparing a catalyst that reduces the deactivation of the metallic nickel phase when exposed to high temperatures and presence of steam for use in a steam reforming process for producing hydrogen or synthesis gas.

As will be explained in more detail below, the present invention provides a practical and efficient solution to the problems of the prior art described above.

SUMMARY OF THE INVENTION

The present invention relates to a process for preparing a nickel-based catalyst promoted by aluminium compounds with increased resistance to thermal deactivation, as well as to the nickel-based catalyst thus obtained.

The present invention relates to a process for preparing a nickel-based catalyst, comprising the steps of providing a first nickel-based catalyst, either by providing a commercial nickel-based catalyst or by carrying out steps (a)-(d):
a) preparing a solution of nickel salt;
b) impregnating a support of one or more inorganic oxides with the solution of nickel salt;
c) drying the impregnated material;
d) calcining the impregnated material;
and additionally comprising the steps of:
e) preparing a solution of an inorganic aluminium salt;
f) impregnating the first nickel-based catalyst with the solution of inorganic aluminium salt, to act as promoter,
g) drying the material impregnated in step f); and
h) calcining the material dried in step g),
wherein steps (e) to (h) may be repeated until a content from 0.5% to 1% w/w of aluminium is reached.

In addition, the present invention relates to a nickel-based catalyst for steam reforming, characterized in that it is prepared according to the process of the invention.

In addition, the present invention relates to a nickel-based catalyst for steam reforming, characterized in that it has a support of one or more inorganic oxides with nickel oxide content between 5 and 40% w/w and content of aluminium with the function of promoter from 0.5% to 1% w/w of aluminium.

In addition, the present invention relates to the use of the catalyst of the invention in a steam reforming process starting from hydrocarbons for production of hydrogen or synthesis gas.

In addition, the present invention relates to a process for steam reforming of hydrocarbons for producing hydrogen or synthesis gas, comprising a step of providing a hydrocarbon to a nickel-based catalyst according to the invention.

BRIEF DESCRIPTION OF THE FIGURES

The appended FIG. 1 illustrates the resistance of the catalyst to the deposition of coke.

DETAILED DESCRIPTION OF THE INVENTION

The present invention relates to a process for preparing a nickel-based catalyst promoted by aluminium compounds for use in a steam reforming process starting from hydrocarbons for producing hydrogen or synthesis gas.

The process for preparing the aluminium-promoted, nickel-based catalyst suitably comprises the following steps:
1. preparing a solution of a nickel salt;
2. impregnating the solution of nickel salt onto the support of one or more inorganic oxides;
3. drying the impregnated material;
4. calcining the impregnated material;
5. preparing a solution, preferably aqueous, of an inorganic aluminium salt;
6. impregnating the material (catalyst) calcined in step 4 with the aqueous solution of the aluminium salt to act as promoter;
7. drying the material impregnated in the preceding step; and
8. calcining the material dried in step 7.

More specifically, the process for preparing a nickel-based catalyst of the present invention involves preparing a solution of a nickel salt, preferably aqueous, preferably selected from nitrate, acetate, oxalate or carbonate, and which may further contain one or more elements of the lanthanide group (or rare earths), preferably lanthanum or cerium.

These catalysts are prepared on refractory supports of one or more inorganic oxides with large surface area, more specifically belonging to the group of aluminas, especially the "alpha" and "theta" aluminas, the calcium aluminates or magnesium aluminates, the zirconium oxides, lanthanum, the hexa-aluminates or else a mixture thereof, in any proportions. In addition, said supports may further contain alkali metals, preferably potassium, at contents between 0.2% and 15%, preferably between 0.5% and 6% w/w (expressed as $K_2O$), and with surface area greater than 2 $m^2$/g, more preferably greater than 20 $m^2$/g.

The particles of the refractory support may be of the most varied shapes that are considered suitable for industrial use in the steam reforming process, including spherical, cylindrical with a central hole ("Raschig" rings) and cylindrical with several holes, preferably those that have 4, 6, 7 or 10 holes, and in addition the surface of the cylinders may be corrugated. The particles of the support are preferably in the range of diameter from 13 mm to 20 mm and height from 10 mm to 20 mm, with smallest wall thickness between 2 mm and 8 mm, preferably between 3 mm and 6 mm.

In general, the drying steps preferably take place at temperatures in the range from about 80° C. to about 140° C. for a period of approximately 1 to 24 hours, whereas the calcining steps preferably take place at temperatures in the range from about 350° C. to about 650° C. for a period of approximately 1 to 4 hours, preferably at temperatures in the range from about 400° C. to about 500° C. for a period of approximately 1 to 2 hours.

Of particular relevance, the process for preparing a nickel-based catalyst of the present invention employs addition of aluminium compounds to the nickel active phase supported on one or more inorganic oxides to act as promoters, and not only to act as a support as taught conventionally in the literature, in which the content of aluminium, expressed as alumina, varies from about 0.5 to about 1.0% w/w.

Preferably, the catalyst according to the present invention is prepared according to steps 5 to 8 of the process disclosed above following steps 1 to 4 or, alternatively, starting from a commercial nickel-based steam reforming catalyst supported on any of the refractory supports described here.

Alternatively, the impregnating and calcining steps from 1 to 4 may be repeated more than once until the desired content of nickel oxide (NiO) is reached in the support. The desired contents of NiO are from about 5% to about 40% (w/w), preferably from about 12% to about 25% (w/w). Similarly, the impregnating and calcining steps 5 to 8 may be repeated more than once until the desired content of aluminium added to the catalyst as promoter is reached.

The process for preparing a catalyst of the present invention is preferably carried out by the method of incipient wetness impregnation, based on a support with one or more inorganic oxides, or by the excess solution method. In the method of incipient wetness impregnation, the support is brought into contact with a volume of solution containing an inorganic nickel salt, and may contain elements of the lanthanide group (or rare earths), sufficient to fill the pores of the support completely. Preferably, the solvent of the impregnation solution is selected from water, alcohols, for example methanol or ethanol, or combinations thereof.

In addition, compounds for controlling pH, increasing solubility or preventing precipitation of phases may be included as additives in the impregnating solution. Non-limiting examples of these compounds are nitric acid, sulphuric acid, phosphoric acid, ammonium hydroxide, ammonium carbonate, hydrogen peroxide ($H_2O_2$), sugars or combinations of these compounds.

Using the process described above, it is possible to obtain an aluminium-promoted, nickel-based catalyst with surprising advantages, since it has greater initial activity and robustness that helps to reduce the risk of appearance of regions with high tube wall temperature when used in a steam reforming process for producing hydrogen or synthesis gas. As result, there is greater resistance to thermal deactivation by sintering of the active phase, giving a steam reforming catalyst with high activity and possessing properties that allow this activity to be maintained for long periods, avoiding the risk of unscheduled stops of the processing unit for producing hydrogen.

The catalyst of the present invention is activated prior to industrial use by reduction of the nickel oxide phases to metallic nickel. Activation is preferably carried out "in situ" in the industrial unit during the procedure for heating the reformer, by passage of a reducing agent, selected from natural gas, hydrogen, ammonia or methanol, in the presence of steam, at temperatures that vary between 400° C. and 550° C. at the top of the reactors and from 750° C. to 850° C. at the outlet therefrom. The pressure during the activation step may be selected between 1 kgf/cm$^2$ (98.06 kPa) and up to the maximum design pressure of the unit, typically about 40 kgf/cm$^2$ (3922.66 kPa). The duration of the reduction step is typically from 1 to 15 hours, preferably from 2 to 6 hours, its end being indicated by the reactor wall temperature and/or by the methane content in the effluent from the reactor, if a mixture of natural gas and steam is used in the activation step, according to conventionally established industrial practice.

The step of "in situ" activation of the catalyst preferably has the following steps:

a) heating the reformer containing the catalyst, with or without a nitrogen stream, up to temperatures about 50° C. above the dew point of steam at the pressure selected for carrying out the activation process and, starting from this moment, introducing steam into the reactor;

b) starting the activation procedure by passing a reducing agent, which may be natural gas, hydrogen, ammonia or methanol, together with steam, through the tubular reactors, while heating of the primary reformer takes place, so that at the top of the tubular reactors the process gas temperatures are between 400° C. and 550° C. and the outlet temperatures are between 750° C. and 850° C., at pressures that vary from 1 kgf/cm$^2$ (98.06 kPa) up to the maximum design pressure of the unit, typically a maximum of 40 kgf/cm$^2$ (3922.66 kPa); and c) continuing operation for a period of from 1 to 15 hours, preferably from 2 to 6 hours, or until it is confirmed that the methane content in the gases leaving the reactor has stabilized at a minimum level, indicating completion of the activation process, and the wall temperatures of the tubes (reactors) indicate that the reduction process has taken place to its full extent.

The catalysts thus prepared may be used in the large-scale production of hydrogen by processes of steam reforming of hydrocarbons, at pressures ranging from 1 kgf/cm$^2$ (98.06 kPa) to 50 kgf/cm$^2$ (4903.33 kPa) at temperatures from 400° C. to 850° C., or higher values, limited by the state of the art of metallurgy of the tubes (reactors), these processes being characterized by the presence of a step of reaction of hydrocarbon and steam for production of a synthesis gas mixture ($CO$, $CO_2$, $H_2$ and methane).

Hydrocarbons suitable for this purpose are natural gas, refinery gas, liquefied petroleum gas (LPG), propane, butane or naphtha, or a mixture thereof.

Typically, the steady-state operating conditions in the period of large-scale production of hydrogen comprise:

a) an inlet temperature of the tubular reactors measured in the process gas of the primary reformer between 400° C. and 600° C.;

b) an outlet temperature of the tubular reactors measured in the process gas of the primary reformer between 700° C. and 900° C., preferably between 750° C. and 900° C.;

c) outlet pressure of the tubular reactors of the primary reformer between 1 kgf/cm$^2$ (98.06 kPa) and 50 kgf/cm$^2$ (4903.33 kPa), preferably between 10 kgf/cm$^2$ (980.66 kPa) and 40 kgf/cm$^2$ (3922.66 kPa);

d) steam/carbon ratio (mol/mol) between 2.0 and 5.0, preferably between 2.5 and 3.5, when using a hydrocarbon feed consisting of natural gas, propane, butane and LPG; and e) steam/carbon ratio (mol/mol) between 2.5 and 6.0, preferably between 2.6 and 4.0 when using a hydrocarbon feed containing naphtha.

Examples for illustrating various embodiments of the present invention, but without limiting its content, are presented below.

COMPARATIVE EXAMPLE

This example illustrates the preparation of a commercial nickel basic catalyst supported on alumina, according to the known prior art.

A catalyst for steam reforming of hydrocarbons consisting of a typical content between 15 to 20% of nickel oxide deposited on a refractory support of the calcium aluminate type, having pellets with a length of 20 mm and an outside diameter of 16 mm, was ground to a range of grain size from 100 to 150 mesh (0.149 to 0.105 mm) so that it could be assessed experimentally in laboratory conditions.

Examples

Examples 1 to 7 given below illustrate the preparation of steam reforming catalysts by the process of the present invention, using various contents of aluminium as promoter.

Example 1

Sixty grams of the commercial catalyst described in the comparative example were impregnated by the pore volume technique with 15.0 ml of aqueous solution containing 2.22 g of aluminium nitrate with the formula $Al(NO_3)_3 \cdot 9H_2O$. The resultant material was dried at 95-110° C. for 12 h and then calcined at a temperature of 450° C. for 4 h in air, to obtain a material containing 0.26% w/w of aluminium as additive for the steam reforming catalyst.

Example 2

This example illustrates the preparation of steam reforming catalysts by the process of the present invention, using aluminium as promoter.

Sixty grams of the commercial catalyst described in the comparative example were impregnated by the pore volume technique with 15.0 ml of aqueous solution containing 4.44 g of aluminium nitrate with the formula $Al(NO_3)_3 \cdot 9H_2O$. The resultant material was dried at 95-110° C. for 12 h and then calcined at a temperature of 450° C. for 4 h in air, to obtain a material containing 0.53% w/w of aluminium as additive for the steam reforming catalyst.

Example 3

This example illustrates the preparation of steam reforming catalysts by the process of the present invention, using aluminium as promoter.

Sixty grams of the commercial catalyst described in the comparative example were impregnated by the pore volume technique with 15.0 ml of aqueous solution containing 6.73 g of aluminium nitrate with the formula $Al(NO_3)_3 \cdot 9H_2O$. The resultant material was dried at 95-110° C. for 12 h and then calcined at a temperature of 450° C. for 4 h in air, to obtain a material containing 0.80% w/w of aluminium as additive for the steam reforming catalyst.

Example 4

This example illustrates the preparation of steam reforming catalysts by the process of the present invention, using aluminium as promoter.

Ninety-eight grams of the commercial catalyst described in the comparative example were impregnated by the pore volume technique with 29.4 ml of aqueous solution containing 7.4 g of aluminium nitrate with the formula $Al(NO_3)_3 \cdot 9H_2O$. The resultant material was dried at 95-110° C. for 12 h and then calcined at a temperature of 450° C. for 4 h in air, to obtain a material containing 1.06% w/w of aluminium as additive for the steam reforming catalyst.

Example 5

This example illustrates the preparation of steam reforming catalysts by the process of the present invention, using aluminium as promoter.

Sixty-nine grams of the material described in example 4 were once again submitted to impregnation by the pore volume technique with 21.0 ml of aqueous solution containing 5.37 g of aluminium nitrate with the formula $Al(NO_3)_3 \cdot 9H_2O$. The resultant material was dried at 95-110° C. for 12 h and then calcined at a temperature of 450° C. for 4 h in air, to obtain a material containing 2.12% w/w of aluminium as additive for the steam reforming catalyst.

Example 6

This example illustrates the preparation of steam reforming catalysts by the process of the present invention, using aluminium as promoter.

About thirty grams of the material described in example 5 were once again submitted to impregnation by the pore volume technique with 12.0 ml of aqueous solution containing 3.13 g of aluminium nitrate with the formula $Al(NO_3)_3 \cdot 9H_2O$. The resultant material was dried at 95-110° C. for 12 h and then calcined at a temperature of 450° C. for 4 h in air, to obtain a material containing 3.18% w/w of aluminium as additive for the steam reforming catalyst.

Example 7

This example illustrates that the catalyst of the present invention has an initial activity in steam reforming higher than those based on the prior art, for aluminium contents between 0.5 and 2.2% w/w, as a promoter.

The steam reforming activity was determined experimentally in AutoChem II commercial equipment (Micromeritics). The tests were carried out using 200 mg of catalyst ground to the range under 170 mesh. Initially an activation (reduction) step was carried out at a temperature of 750° C., at atmospheric pressure for two hours, by passing 40 mL/min of a mixture containing 10% of $H_2$/argon saturated with steam at 50° C. over the catalyst. Activation was followed by the reaction of steam reforming of methane, by passage of a stream of methane (99.99%) saturated with steam at 90° C., which corresponds to a steam/carbon ratio of 2.3 mol/mol, at reaction temperatures of 500° C., 550° C. and 600° C., respectively. The gases leaving the reactor were analysed by gas chromatography and the activity was measured by the degree of methane conversion.

Table 1 presents the results for catalytic activity in steam reforming of methane at different temperatures.

TABLE 1

| Example | Al content (% w/w) | T = 500° C. | T = 550° C. | T = 600° C. |
|---|---|---|---|---|
| Comparative | 0 | 37.5 | 48.2 | 55.2 |
| 1 | 0.26 | 35.3 | 46.4 | 52.0 |
| 2 | 0.53 | 40.0 | 49.7 | 57.5 |
| 3 | 0.80 | 39.4 | 50.2 | 58.4 |
| 4 | 1.06 | 39.5 | 48.6 | 56.5 |
| 5 | 2.12 | 39.5 | 49.2 | 56.8 |
| 6 | 3.18 | 20.3 | 36.7 | 48.4 |

As can be deduced from the above table, a low catalytic activity is observed for the catalysts promoted with aluminium having contents above or below the recommended range, especially examples 1 and 6.

Example 8

This example illustrates that the catalyst of the present invention has a steam reforming activity after undergoing a period of deactivation by exposure to high temperatures, above those based on the prior art, for contents of aluminium as promoter between 0.5 and 1.1% w/w.

Accelerated deactivation of the catalysts was carried out following measurement of the initial activity described in example 6 by the passage of a stream containing 10% of $H_2$ in argon saturated with steam at 50° C. at atmospheric pressure, at a temperature of 900° C. for 4 h. Then the temperature was lowered to 500° C. and measurement of the steam reforming activity was undertaken by passing 40 mL/min of a mixture containing 10% of $H_2$/argon saturated with steam at 50° C. over the catalyst. After activation, the reaction of steam reforming of methane was carried out, by passage, at atmospheric pressure, of a stream of methane (99.99%) saturated with steam at 90° C., which corresponds to a steam/carbon ratio of 2.3 mol/mol, at reaction temperatures of 500° C., 550° C. and 600° C., respectively. The gases leaving the reactor were analysed by gas chromatography and the activity was measured by the degree of methane conversion.

Table 2 presents the results for catalytic activity in steam reforming of methane at different temperatures.

TABLE 2

| Example | Al content (% w/w) | T = 500° C. | T = 550° C. | T = 600° C. |
| --- | --- | --- | --- | --- |
| Comparative | 0 | 34.1 | 45.2 | 53.2 |
| 1 | 0.26 | 33.6 | 44.9 | 54.0 |
| 2 | 0.53 | 34.8 | 45.2 | 55.1 |
| 3 | 0.80 | 34.2 | 46.1 | 54.9 |
| 4 | 1.06 | 34.4 | 44.3 | 56.8 |
| 5 | 2.12 | 17.8 | 30.3 | 41.4 |
| 6 | 3.18 | 16.5 | 29.7 | 40.4 |

In Table 2, higher catalytic activities are observed for the catalysts with aluminium as promoter at contents in the range from about 0.5 to about 1% w/w, just as in examples 2 to 4.

Example 9

This example illustrates that the properties of resistance to coke formation of the catalyst of the present invention, relative to the prior art, are not due to the addition of aluminium as promoter.

The catalysts were tested in TGA/SDTA851E commercial thermogravimetry equipment (TGA Mettler Toledo). The tests were carried out using 25 mg of catalyst ground to the range under 170 mesh. Initially a reduction step was carried out by passage of 40 mL/min of a mixture containing 10% of hydrogen/argon saturated with steam at 15° C. and 40 mL/min of nitrogen (shielding gas), with programming of temperature varying from 100° C. up to 600° C. at a rate of 10° C./min. The temperature of 600° C. was maintained for two hours until completion of the reduction step. Then a coking step was carried out, also at 600° C., by passage of a stream consisting of 5% of ethane, 20% of hydrogen balanced with nitrogen saturated with steam at 15° C., corresponding to a steam/carbon ratio of 0.17 mol/mol.

The resistance to coking, presented in FIG. 1, shows that addition of aluminium does not significantly alter the resistance to deposition of coke at the aluminium contents according to the present invention, and it is thus suitable for industrial use. Often, promoters tend to improve a particular property of the catalyst, but cause a significant, undesirable reduction of another property, which limits their industrial application.

Numerous variations falling within the scope of protection of the present application are permitted.

The invention claimed is:

1. Process for preparing a nickel-based catalyst, comprising the step of providing a first nickel-based catalyst, either by providing a commercial nickel-based catalyst or by carrying out steps (a)-(d):
   a) preparing a solution of nickel salt;
   b) impregnating a support of one or more inorganic oxides with the solution of nickel salt;
   c) drying the impregnated material;
   d) calcining the impregnated material;
   and additionally comprising the steps of:
   e) preparing a solution of an inorganic aluminum salt;
   f) impregnating the first nickel-based catalyst with the solution of inorganic aluminum salt, to act as promoter,
   g) drying the material impregnated in step f); and
   h) calcining the material dried in step g),
   wherein steps (e) to (h) may be repeated until a content from 0.5% to 1% w/w of aluminum is reached.

2. Process for preparing a nickel-based catalyst according to claim 1, wherein the nickel salt is selected from the group consisting of nitrate, acetate, oxalate or carbonate.

3. Process for preparing a nickel-based catalyst according to claim 1 wherein the solution of nickel salt additionally comprises one or more elements of the lanthanide group, preferably lanthanum or cerium.

4. Process for preparing a nickel-based catalyst according to claim 1, wherein the support of one or more inorganic oxides is selected from the group consisting of alumina, calcium aluminates, magnesium aluminates, zirconium oxides, lanthanum, hexa-aluminates or a mixture thereof.

5. Process for preparing a nickel-based catalyst according to claim 1, wherein the support of one or more inorganic oxides additionally comprises one or more alkali metals, preferably potassium.

6. Process for preparing a nickel-based catalyst according to claim 1, wherein the support of one or more inorganic oxides has a surface area greater than 2 $m^2/g$, preferably greater than 20 $m^2/g$.

7. Process for preparing a nickel-based catalyst according to claim 1, wherein the drying in steps c) and g) takes place at temperatures in the range from 80° C. to 140° C. for a period of from 1 to 24 hours.

8. Process for preparing a nickel-based catalyst according to claim 1, wherein the calcination in steps d) and h) takes place at temperatures in the range from 350° C. to 650° C. for a period of from 1 to 4 hours, preferably at temperatures in the range from 400° C. to 500° C. for a period of from 1 to 2 hours.

9. Process for preparing a nickel-based catalyst according to claim 1, wherein steps (a) to (d) are repeated until the content of nickel oxide in the support is between 5 and 40% w/w, preferably between 12 and 25% w/w.

10. Process for preparing a nickel-based catalyst according to claim 1, wherein the solution of nickel salt and/or the solution of aluminium salt are aqueous.

11. Process for preparing a nickel-based catalyst according to claim 1, wherein steps b) and/or f) are carried out by the method of incipient wetness impregnation or excess of solution.

* * * * *